(12) United States Patent
Chen

(10) Patent No.: US 6,738,255 B2
(45) Date of Patent: May 18, 2004

(54) COMPUTER ENCLOSURE WITH PIVOTING FRONT PANEL

(75) Inventor: Yun-Lung Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/191,092

(22) Filed: Jul. 8, 2002

(65) Prior Publication Data

US 2003/0202319 A1 Oct. 30, 2003

(30) Foreign Application Priority Data

Apr. 30, 2002 (TW) ...................................... 91205978 U

(51) Int. Cl.⁷ ................................................. G06F 1/16
(52) U.S. Cl. ........................ 361/683; 361/679; 361/724; 312/223.2; 312/263
(58) Field of Search ................................ 361/683, 679, 361/780, 681, 682, 724–727; 312/223.1, 223.2, 223.3, 223.4, 223.5, 223.6, 265.5; 292/80–83, 146, 87, 91, 102, DIG. 38, 275; 174/52.1, 35 R; 403/326, 329; 360/97.01, 98.01, 137, 137 D; 16/239, 357, 359, 362

(56) References Cited

U.S. PATENT DOCUMENTS

| | | | | |
|---|---|---|---|---|
| 5,423,605 A | * | 6/1995 | Liu ........................... | 312/265.6 |
| 5,845,977 A | * | 12/1998 | Neukam et al. ......... | 312/223.2 |
| 5,997,115 A | * | 12/1999 | Radloff et al. ............... | 312/222 |
| 6,038,892 A | * | 3/2000 | Schmitt .......................... | 70/78 |
| 6,053,586 A | * | 4/2000 | Cook et al. ............... | 312/223.2 |
| 6,054,662 A | * | 4/2000 | Hrehor et al. .............. | 200/332 |
| 6,144,549 A | * | 11/2000 | Moss et al. .................. | 361/681 |
| 6,234,593 B1 | * | 5/2001 | Chen et al. ............... | 312/223.2 |
| 6,288,333 B1 | * | 9/2001 | Liu et al. .................... | 174/52.1 |
| 6,373,690 B1 | * | 4/2002 | Buican et al. .............. | 361/683 |
| 6,555,747 B2 | * | 4/2003 | Chen et al. ................. | 174/52.1 |

FOREIGN PATENT DOCUMENTS

EP  0 425 170 A2 * 2/1991 ............. G06F/1/16

OTHER PUBLICATIONS

Article "Method of Aligning and Securing Personal Panel Bezels", IBM Technical Disclosure Bulletin, vol. 35, Issue 5, pp. 259–261, Oct. 1, 1992.*

* cited by examiner

Primary Examiner—Michael Datskovsky
(74) Attorney, Agent, or Firm—Wei Te Chung

(57) ABSTRACT

A computer enclosure includes a front bezel (10) and a front plate (40). A pair of symmetrically opposing pivots (24) is formed on the front bezel. A pair of L-shaped bearings (48) is forwardly formed from a bottom portion of the front plate. When the front bezel is attached to the front plate, the pivots of the front bezel are pivotably received in the bearings of the front plate. The front bezel is rotated toward the front plate about the pivots. Clasps (11) of the front bezel are inserted into slots (42) defined in the front plate, and hooks (44) of the front plate snappingly engage in engaging apertures (12) defined in the clasps. Thus the front bezel fully abuts the front plate, and is securely attached thereon.

18 Claims, 4 Drawing Sheets

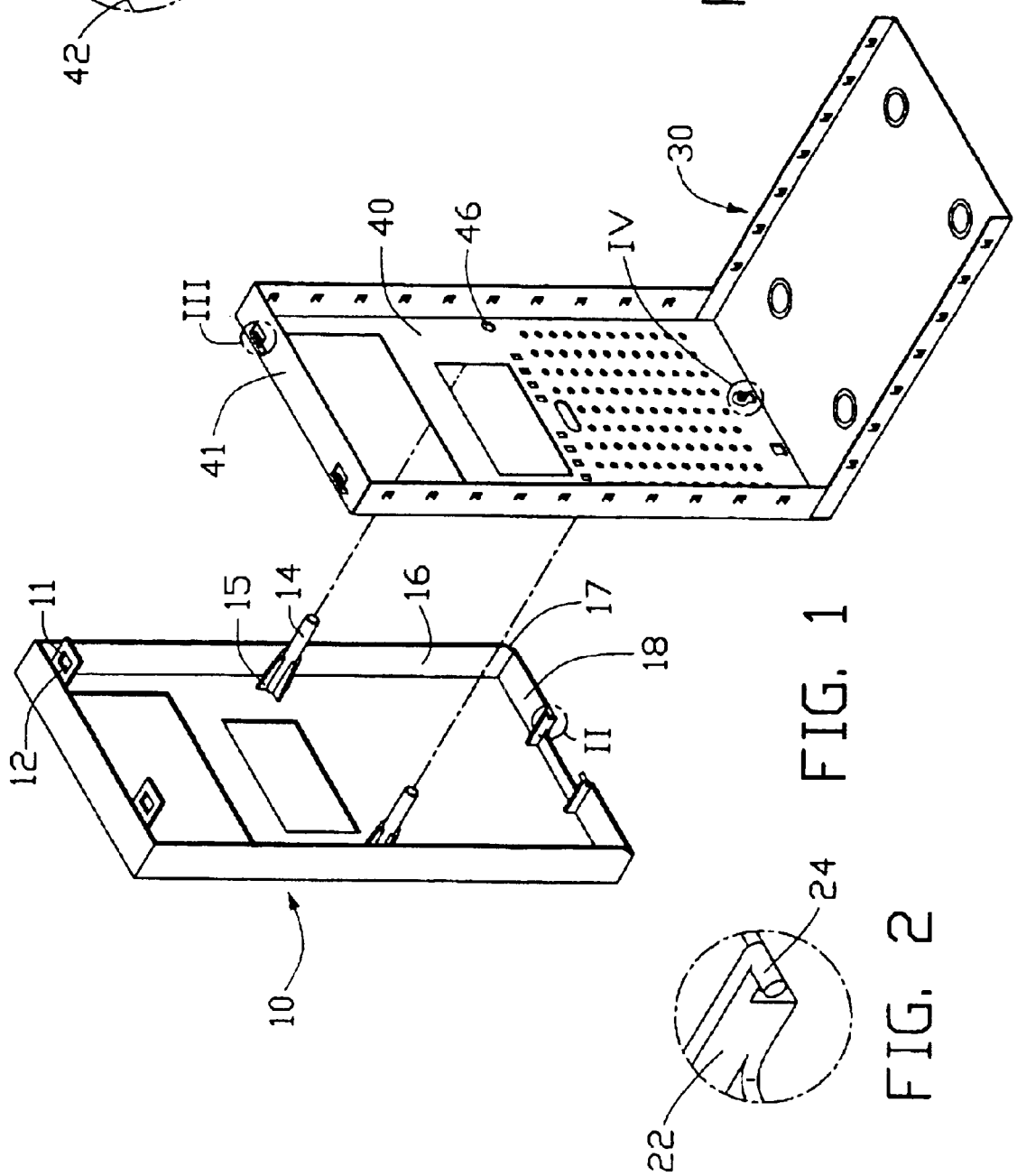

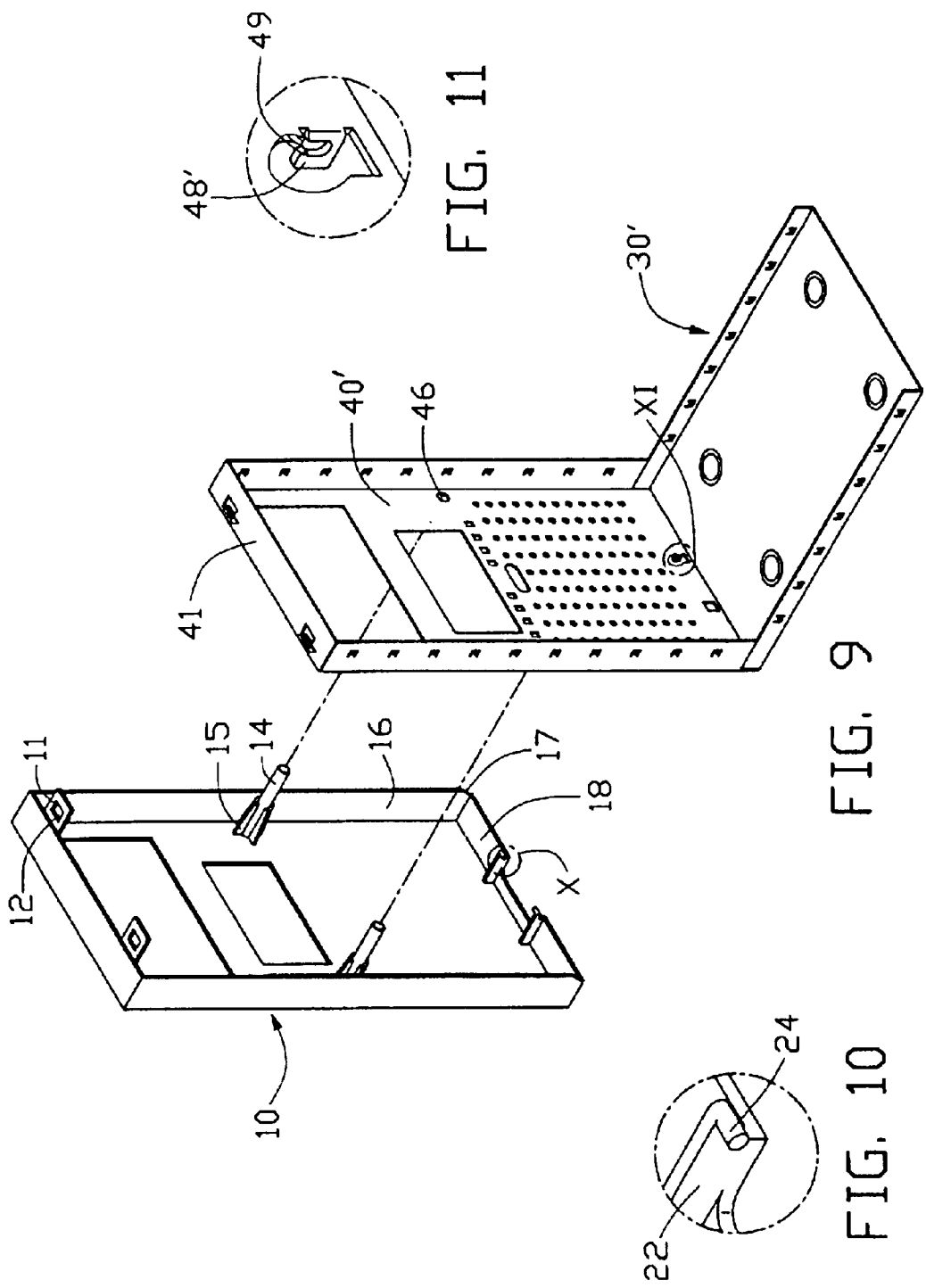

COMPUTER ENCLOSURE WITH PIVOTING FRONT PANEL

BACKGROUND OF THE INVENTION

1. Field of the Invention

The present invention relates to computer enclosures, and particularly to computer enclosures having front panels pivotally attached thereto.

2. Description of Related Art

In a typical personal computer, a front bezel is attached to a front plate of an enclosure to make the computer more aesthetically pleasing. Conventionally, the front bezel is attached to the front plate with a plurality of screws. Fastening the screws is tedious and time-consuming, and a special tool is required.

To overcome this problem, an alternative computer enclosure has been developed. A plurality of spaced clasps is arranged on the bezel, and a plurality of corresponding holes is defined in the front plate. The clasps are extended into and engaged in the holes, thereby securing the front bezel to the front plate. However, it is difficult to simultaneously align all the clasps with all the holes. In addition, the clasps are prone to break during this assembly process.

Therefore, an improved computer enclosure that overcomes the above-mentioned problems is desired.

SUMMARY OF THE INVENTION

Accordingly, an object of the present invention is to provide a computer enclosure which quickly and conveniently secures a front bezel to a front plate thereof.

In order to achieve the object set out above, a computer enclosure in accordance with the present invention includes a front bezel and a front plate. A pair of symmetrically opposing pivots is formed on the front bezel. A pair of L-shaped bearings is forwardly formed from a bottom portion of the front plate. When the front bezel is attached to the front plate, the pivots of the front bezel are pivotably received in the bearings of the front plate. The front bezel is rotated toward the front plate about the pivots. Clasps of the front bezel are inserted into slots defined in the front plate, and hooks of the front plate snappingly engage in engaging apertures defined in the clasps. Thus the front bezel fully abuts the front plate, and is securely attached thereon.

Other objects, advantages and novel features of the present invention will be drawn from the following detailed description of preferred embodiments of the present invention with attached drawings, in which:

BRIEF DESCRIPTION OF THE DRAWINGS

FIG. 1 is an exploded isometric view of a computer enclosure in accordance with a preferred embodiment of the present invention, including a front bezel and a front plate;

FIGS. 2, 3 and 4 are enlarged views of circled portions II, III and IV respectively of FIG. 1;

FIG. 9 is an exploded isometric view of a computer enclosure in accordance with an alternative embodiment of the present invention, including a front bezel and a front plate; and FIGS. 10 and 11 are enlarged views of circled portions X and XI respectively of FIG. 9.

DETAILED DESCRIPTION OF THE INVENTION

Figure 5:
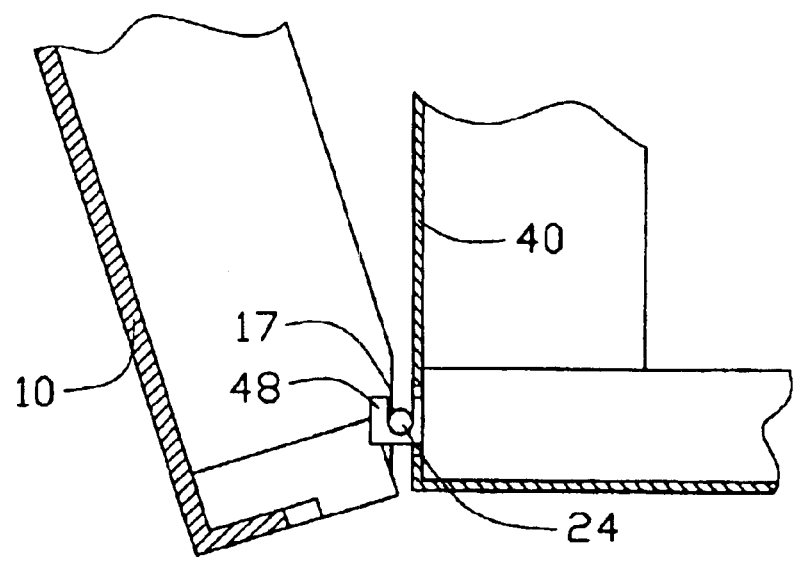
FIGS. 5 and 6 are partial cross-sectional views of FIG. 1, showing two successive stages of attachment of the front bezel to the front plate.

FIG. 1 is an exploded isometric view of a computer enclosure in accordance with a preferred embodiment of the present invention. The computer enclosure includes a front bezel 10 and a base 30.

The front bezel 10 is rectangular, and comprises a peripheral flange 16 extending rearwardly from four peripheral edges thereof. The peripheral flange 16 comprises a horizontal bottom flange 18. A depth of the horizontal bottom flange 18 is less than a depth of a remainder of the peripheral flange 16. Accordingly, a pair of sloped portions 17 connects respective opposite ends of the bottom flange 18 with the remainder of the peripheral flange 16. A pair of spaced clasps 11 extends rearwardly from a junction of the front bezel 10 and a top horizontal portion of the peripheral flange 16. An engaging aperture 12 is defined in each clasp 11. A pair of locating posts 14 extends rearwardly from opposite sides of a middle portion of the front bezel 10. A plurality of longitudinal fins 15 adjoins a periphery of each locating post 14 and the front bezel 10, for reinforcing the locating post 14. A pair of ribs 22 extends upwardly from the bottom flange 18. Opposing pivots 24 are formed on rear portions of the ribs 22 respectively (see FIG. 2).

The base 30 includes a bottom plate and a front plate 40. A pair of spaced slots 42 is defined in a top portion of the front plate 40, for receiving the clasps 11 of the front bezel 10. A top flange 41 extends rearwardly from a top edge of the base 30. A pair of hooks 44 is downwardly stamped from the top flange 41, for engaging in the engaging apertures 12 of the clasps 11 of the front bezel 10 (see FIG. 3). A pair of locating holes 46 is defined in opposite sides of a middle portion of the front plate 40, for receiving the locating posts 14 of the front bezel 10. A pair of L-shaped bearings 48 is forwardly formed from a middle of a bottom portion of the front plate 40, for holding the pivots 24 of the front bezel 10 therein (see FIG. 4).

Figure 6:
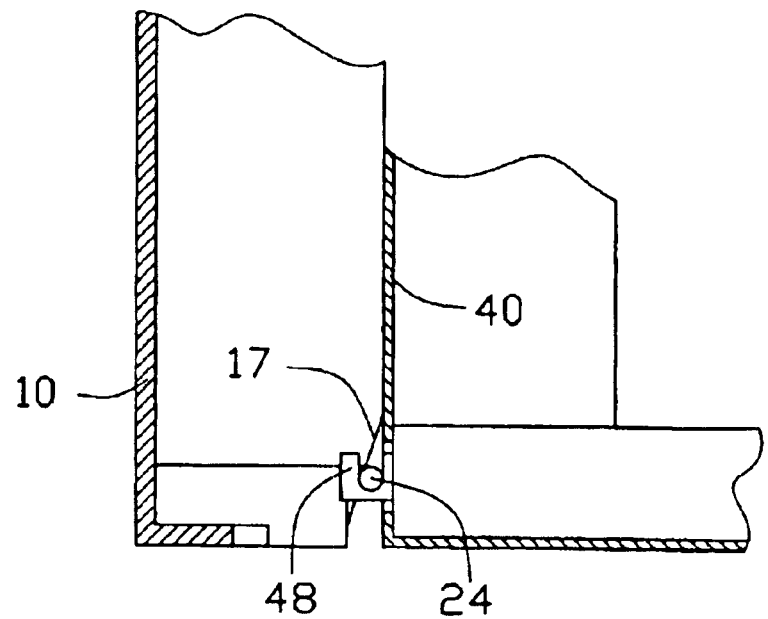
Figures 7, 8:
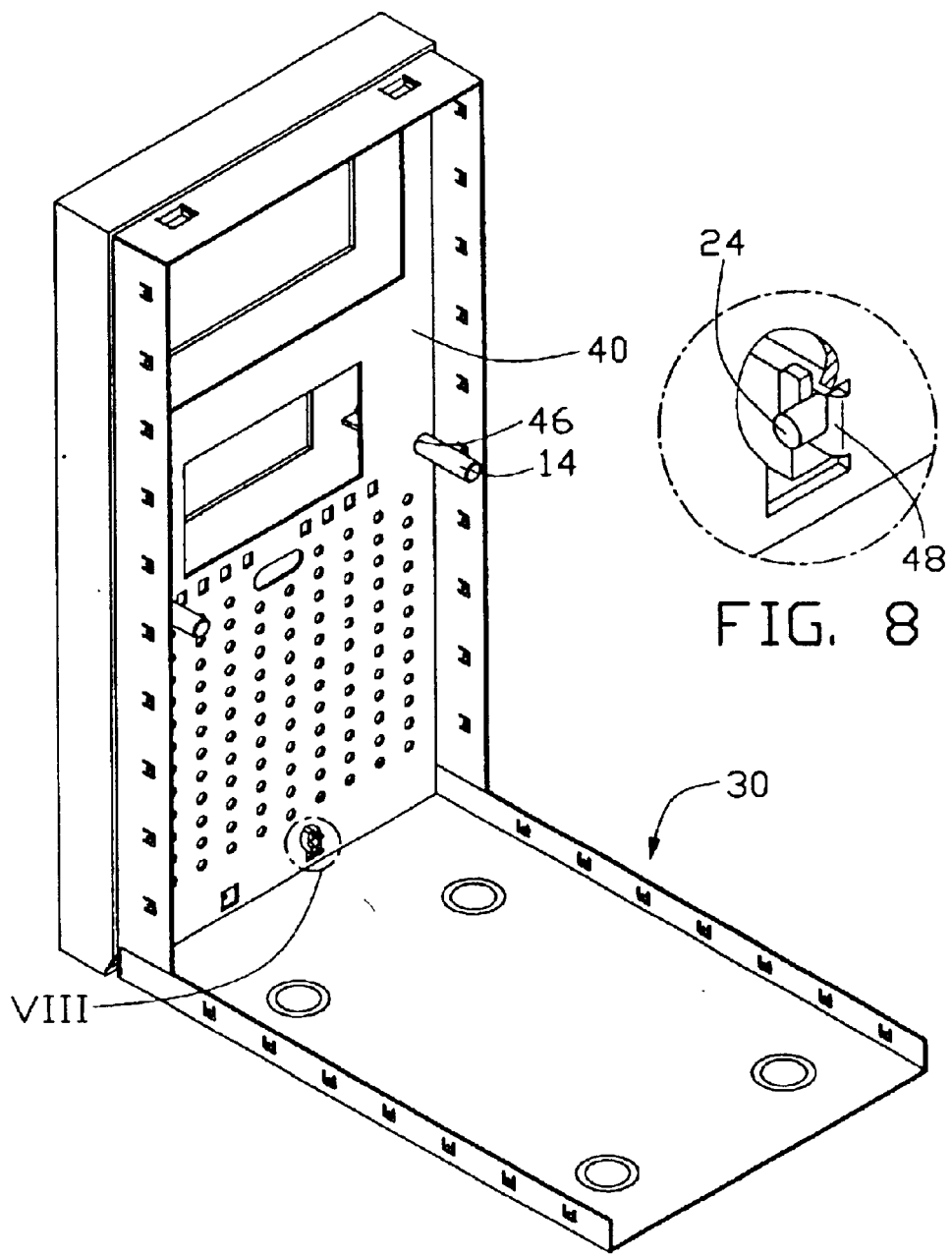
FIG. 7 is an assembled view of FIG. 1.
FIG. 8 is an enlarged view of a circled portion VIII of FIG. 7.

Referring to FIGS. 5 to 7, in assembly, the front bezel 10 is attached to the front plate 40 of the base 30. The sloped portions 17 of the front bezel 10 allow the front bezel 40 to be oriented close to the front plate 40 at an acute angle. The pivots 24 of the front bezel 10 are pivotably received in the bearings 48 of the base 30 (see FIG. 8). The front bezel 10 is rotated toward the front plate 40 about the pivots 24. The locating posts 14 of the front bezel 10 are inserted into the locating holes 46 of the front plate 40. The clasps 11 of the front bezel 10 are inserted into the slots 42 of the front plate 40, with the hooks 44 snappingly engaging in the engaging apertures 12 of the clasps 11. Thus the front bezel 10 fully abuts the front plate 40, and is securely attached thereon.

To detach the front bezel 10 from the base 30, the clasps 11 are pressed downwardly to cause the hooks 44 to escape from the engaging apertures 12. An upper portion of the front bezel 10 is pushed outwardly. The clasps 11 escape from the slots 42, and the locating posts 14 escape from the locating holes 46. Finally, the pivots 24 are removed from the bearings 48. Thus, the front bezel 10 is detached from the front plate 40.

FIGS. 9 to 11 show a computer enclosure in accordance with an alternative embodiment of the present invention. This alternative embodiment differs from the preferred embodiment only regarding the bearings 48 of the front plate 40. In the alternative embodiment, a protuberance 49 is formed at a free end of each of L-shaped bearings 48' of a front plate 40' of a base 30' (see FIG. 11). Thus the pivots 24 can be held in the bearings 48' more securely. The pivots 24 are protected from slipping out of the bearings 48' when the front bezel 10 is rotated.

It is to be further understood that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
   a front panel comprising at least one pivot, a plurality of locating posts spaced from the at least one pivot, and a plurality of clasps distal from the at least one pivot; and
   a front plate comprising at least one generally L-shaped bearing pivotably receiving the at least one pivot therein, a plurality of locating holes for receiving the locating posts, and a plurality of slots for engagingly receiving the clasps:
   wherein the front panel is rotatable toward the front plate about the at least one pivot until the locating posts are received in the locating holes and the clasps are received in the slots, whereby the front panel is secured to the front plate.

2. The computer enclosure as described in claim 1, wherein the front panel further comprises a peripheral flange extending rearwardly therefrom.

3. The computer enclosure as described in claim 2, wherein the peripheral flange comprises a narrowed lower flange, and a pair of sloped portions connecting opposite ends of the lower flange with a remainder of the peripheral flange.

4. The computer enclosure as described in claim 3, wherein a pair of ribs is arranged at the lower flange, and the front panel comprises two pivots arranged at the ribs.

5. The computer enclosure as described in claim 1, wherein a hook is arranged adjacent each of the slots of the front plate, and an aperture is defined in each of the clasps of the front panel, the hooks being engagable in the apertures when the clasps are received in the slots.

6. The computer enclosure as described in claim 5, wherein each of the hooks is stamped from an upper flange that is arranged rearwardly of the front plate.

7. The computer enclosure as described in claim 1, wherein the at least one bearing has at least one protuberance arranged at a free end thereof.

8. A computer enclosure comprising:
   a front bezel having at least one pivot arranged at one end thereof, a plurality of clasps extending rearwardly from the front bezel; and
   a front plate having at least one bearing pivotably supporting the at least one pivot, and a plurality of slots for engagingly receiving the clasps;
   wherein when the front bezel is rotated toward the front plate about the at least one pivot, the clasps are engagingly received in the slots, whereby the front bezel is secured to the front plate;
   wherein a hook is arranged adjacent each of the slots of the front plate, and an aperture is defined in each of the clasps of the front bezel, the hooks being engagable in the apertures when the clasps are received in the slots;
   wherein each of the hooks is stamped from an upper flange that is arranged rearwardly of the front plate.

9. The computer enclosure as described in claim 8, wherein the at least one bearing is generally L-shaped and forwardly formed from the front plate, and the at least one pivot is generally parallel to the front bezel.

10. The computer enclosure as described in claim 9, wherein the at least one bearing has at least one protuberance arranged at a free end thereof.

11. The computer enclosure as described in claim 8, wherein the front bezel further has a peripheral flange extending rearwardly therefrom.

12. The computer enclosure as described in claim 11, wherein the peripheral flange comprises a narrowed lower flange, and a pair of sloped portions connecting opposite ends of the lower flange with a remainder of the peripheral flange.

13. The computer enclosure as described in claim 12, wherein a pair of ribs is arranged at the lower flange, and the front bezel has two pivots arranged at the ribs.

14. The computer enclosure as described in claim 8, wherein the front bezel further has a plurality of locating posts, and the front plate further has a plurality of locating holes for receiving the locating posts.

15. A computer enclosure comprising:
   discrete rectangular metal plate and plastic bezel defining a full dimension along a lengthwise dimension thereof,
   said plate defining at least one locating hole extending therethrough in a front-to-back direction,
   said bezel defining at least one locating post extending rearwardly and through said locating hole;
   a pivot formed on one of said plate and said bezel around an edge thereof; and
   a bearing socket protrusively formed on the other one of said plate and said bezel around a corresponding edge thereof;
   wherein
   said locating post and locating hole are spaced from the pivot and the bearing socket along said lengthwise direction with a distance substantially at least one half of said full dimension along said lengthwise direction, and at least one of said plate and said bezel defines cutouts (17) around the corresponding edge where said pivot or said bearing socket is located so as to allow pivotal assembling, about the pivot, between the plate and the bezel without interference.

16. The enclosure as described in claim 15, wherein said plate and said bezel are parallel to each other when assembled.

17. The enclosure as described in claim 15, wherein said plate and said bezel include interlocking means for securing each other together.

18. The enclosure as described in claim 17, wherein said interlocking means is located on corresponding edges opposite to the edges where the pivot and the bearing socket are located.

* * * * *